United States Patent
Galea et al.

(10) Patent No.: US 10,348,429 B2
(45) Date of Patent: Jul. 9, 2019

(54) CLOCK SYNCHRONIZATION OVER REDUNDANT NETWORKS

(71) Applicant: Siemens Canada Limited, Oakville, Ontario (CA)

(72) Inventors: Michael Galea, Toronto (CA); Michael Pustylnik, Toronto (CA); Amin Abdul, Thornhill (CA)

(73) Assignee: SIEMENS CANADA LIMITED, Ontario, CA (US)

( * ) Notice: Subject to any disclaimer, the term of this patent is extended or adjusted under 35 U.S.C. 154(b) by 35 days.

(21) Appl. No.: 15/502,856

(22) PCT Filed: Sep. 12, 2014

(86) PCT No.: PCT/CA2014/050866
§ 371 (c)(1),
(2) Date: Feb. 9, 2017

(87) PCT Pub. No.: WO2016/037259
PCT Pub. Date: Mar. 17, 2016

(65) Prior Publication Data
US 2017/0237512 A1 Aug. 17, 2017

(51) Int. Cl.
*H04J 3/06* (2006.01)
*H04W 56/00* (2009.01)

(52) U.S. Cl.
CPC .......... *H04J 3/0667* (2013.01); *H04J 3/0641* (2013.01); *H04J 3/0644* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 8,812,256 B2* | 8/2014 | Lee ..................... | H04J 3/0688 702/89 |
| 8,879,552 B2* | 11/2014 | Zheng ................. | H04J 3/0667 370/390 |

(Continued)

FOREIGN PATENT DOCUMENTS

EP     2709298 A1     3/2014

OTHER PUBLICATIONS

PCT Search report dated Jul. 17, 2015 corresponding to PCT Application No. PCT/CA2014/050866 filed Sep. 12, 2014 (10 pages).

(Continued)

*Primary Examiner* — Gregory B Sefcheck

(57) ABSTRACT

A method of facilitating clock synchronization over redundant networks may include, when a SYNC message and a DELAY_REQ message of a PTP clock synchronization cycle are carried by different redundant networks, adjusting a timestamp associated with one of the messages to emulate carriage of the SYNC message and the DELAY_REQ message by the same redundant network. In a method of facilitating PTP clock synchronization, an indicator of an operational status of each of a pair of redundant networks for carrying messages from a slave clock to a master clock may be embedded in a PTP message destined for the slave clock. An indicator of which one of the pair of redundant networks is valid for PTP clock synchronization may be obtained from a PTP message destined for the master clock. PTP messages to the master clock may be selectively relayed based on whether the PTP messages have been received from the valid one of the redundant networks.

20 Claims, 8 Drawing Sheets

(56) References Cited

U.S. PATENT DOCUMENTS

| | | | | |
|---|---|---|---|---|
| 8,879,586 B2* | 11/2014 | Tzeng | H04J 3/0635 | 370/503 |
| 8,913,632 B2* | 12/2014 | Aweya | H04J 3/0664 | 370/503 |
| 9,112,631 B2* | 8/2015 | Aweya | H04J 3/0682 | |
| 9,178,637 B2* | 11/2015 | Aweya | H04J 3/0602 | |
| 9,258,073 B2* | 2/2016 | Le Pallec | H04J 3/0697 | |
| 9,331,805 B2* | 5/2016 | Steiner | H04J 3/0641 | |
| 9,407,733 B1* | 8/2016 | Mizrahi | H04L 69/22 | |
| 9,544,247 B2* | 1/2017 | Alsup | H04L 49/251 | |
| 9,642,134 B2* | 5/2017 | Sawai | H04W 4/70 | |
| 9,806,835 B2* | 10/2017 | Mizrahi | H04J 3/0602 | |
| 9,832,254 B2* | 11/2017 | Heine | H04L 67/10 | |
| 9,882,666 B2* | 1/2018 | Hsueh | H04J 3/0667 | |
| 10,045,342 B2* | 8/2018 | Sawai | H04W 4/70 | |
| 10,075,287 B2* | 9/2018 | Wang | H04J 3/0641 | |
| 2012/0275501 A1* | 11/2012 | Rotenstein | H04J 3/0667 | 375/220 |
| 2012/0278421 A1* | 11/2012 | Sun | H04Q 9/00 | 709/208 |
| 2013/0227172 A1* | 8/2013 | Zheng | H04J 3/0641 | 709/248 |
| 2014/0177653 A1* | 6/2014 | Tzeng | H04J 3/0635 | 370/503 |
| 2014/0211780 A1* | 7/2014 | Kang | H04W 76/10 | 370/350 |
| 2015/0263922 A1* | 9/2015 | Edsall | H04L 43/028 | 370/252 |
| 2017/0118141 A1* | 4/2017 | Alsup | H04L 49/251 | |
| 2017/0279552 A1* | 9/2017 | Heine | H04J 3/0667 | |

OTHER PUBLICATIONS

Guo H. et al.: "Time Synchronization (IEEE 1588) and Seamless Communication Redundancy (IEC 62439-3) Techniques for Smart Grid Substations"; 12th IET International Conference on Developments in Power System Protection (DPSP2014) / Mar. 31, 2014 (6 pages).

* cited by examiner

CLOCK SYNCHRONIZATION OVER REDUNDANT NETWORKS

FIELD OF TECHNOLOGY

The present disclosure relates to clock synchronization, and more particularly to clock synchronization over redundant networks.

BACKGROUND

A distributed system may contain multiple nodes interconnected by a computer network. A node may be any form of computing device, such as a computer, mobile device, tablet, industrial machine, or a machine on the Internet of Things, to name but a few non-limiting examples. Each node may comprise a clock. The clock may for example comprise an oscillator and may form part of a processing circuit, such as a central processing unit (CPU) or graphics processing unit (GPU) for example. The accuracy or operating conditions of each clock may vary in relation to those of the others. These differences may lead to drift between the clocks at different network nodes. Such drift may be considered undesirable, e.g. when it is desirable or necessary to synchronize events occurring at different nodes within the distributed system.

The IEEE 1588 Precision Time Protocol (PTP) defines a standardized method for synchronizing clocks over a network. PTP synchronization (i.e. synchronization according to IEEE 1588) involves a predetermined exchange of messages including a SYNC message, a DELAY_REQ message, and a DELAY_RESP message (the messages also being referred to as "packets" or "frames"). The exchange is initiated by the master clock and yields four timestamps, which are commonly identified using the identifiers $t1$, $t2$, $t3$ and $t4$ (or, in some references, as $T1$, $T1'$, $T2$ and $T2'$ respectively). The first two timestamps $t1$ and $t2$ indicate a time of transmission and a time of receipt, respectively, of a message sent from the master clock to the slave clock. The second two timestamps $t3$ and $t4$ indicate a time of transmission and a time of receipt, respectively, of a message sent in the opposite direction, from the slave clock to the master clock.

The slave clock uses the timestamps $t1$, $t2$, $t3$ and $t4$ to compute an offset between itself and the master clock. This is done using a predetermined algorithm, defined in the IEEE 1588 standard, which is referred to herein as the "PTP clock offset algorithm." The relative simplicity of the PTP clock offset algorithm, i.e. requiring only timestamps $t1$, $t2$, $t3$ and $t4$ to compute the offset, is made possible by a number of assumptions upon which the algorithm is premised. One such assumption is that the propagation delay of a message traveling over a network between the master clock and the slave clock is the same in both directions.

Once the slave clock has computed the offset using the PTP clock offset algorithm, the slave clock adjusts itself to eliminate the offset. In this way, each slave clock independently synchronizes itself with the master clock. This may be done at periodic intervals.

Some distributed systems may employ a pair of redundant computer networks between system nodes for increased reliability. For example, the IEC 62439-3 standard defines the Parallel Redundancy Protocol (PRP) and High-availability Seamless Redundancy (HSR) protocol, which may be used for this purpose. In a distributed system comprised of PRP/HSR devices (i.e. devices that are compliant with either or both of these protocols) communicating over a pair of redundant networks, the redundant networks provide two available paths for messages between each pair of network devices. According to the PRP/HSR protocols, each message originating from a source node is duplicated to create a pair of redundant messages. The pair of redundant messages is sent over the pair of redundant networks respectively. If one of the redundant networks fails, or one of the messages is dropped, the redundant (duplicate) message being carried by the other redundant network may still reach its destination. In this way, reliability may be improved. Any duplicate messages detected at the receiving end are removed.

In a distributed system employing redundant networks (e.g. using PRP/HSR), the redundant networks may be transparent to upper layer entities at the source and destination nodes that communicate through lower layer modules/devices (e.g. PRP/HSR modules/devices). Because the redundancy may be hidden from the communicating entities, it may be unclear to those entities whether a message successfully transmitted from a source node to a destination node was carried by the same redundant network as a message successfully transmitted in the opposite direction between those nodes. If each of the redundant networks imparts a different propagation delay to a message carried between these nodes, it may not be safe to assume that the propagation delay experienced by messages sent between a pair of communication entities is the same in both directions.

SUMMARY

In one aspect, there is provided a method of facilitating clock synchronization over redundant networks, comprising: when a SYNC message and a DELAY_REQ message of a Precision Time Protocol "PTP" clock synchronization cycle are carried by different redundant networks, adjusting a timestamp associated with one of the messages as though the SYNC message and the DELAY_REQ message were carried by the same redundant network.

In some embodiments, the adjusting adjusts a timestamp in the DELAY_RESP message and is performed at a PRP/HSR device.

In some embodiments, the adjusting is based on a difference in propagation delay between the redundant networks.

In some embodiments, the DELAY_RESP message with the adjusted timestamp is passed to a slave clock, and the adjusting is transparent to the slave clock.

In some embodiments, the adjusting of the timestamp in the DELAY_RESP message is performed by a PRP/HSR device that is either a doubly-attached node comprising the slave clock or a redundant box to which the slave clock is external.

In some embodiments, the adjusting of the timestamp in the DELAY_RESP message is performed by a PRP/HSR device that is either a doubly-attached node comprising a master clock or a redundant box to which the master clock is external.

In another aspect, there is provided a method of facilitating Precision Time Protocol "PTP" synchronization of a slave clock and a master clock intercommunicating over pair of redundant networks, the method comprising: determining a time of receipt of a SYNC message from a first redundant network of the pair of redundant networks; determining a time of receipt of a DELAY_REQ message from a second redundant network of the pair of redundant networks; and adjusting the time of receipt of the DELAY_REQ message as though the DELAY_REQ message were received from the first redundant network.

In some embodiments, the SYNC message is a firstly received one, or a solely received one, of a pair of redundant SYNC messages sent over the pair of redundant networks respectively.

In some embodiments, the method further comprises, in response to the receiving of the firstly received one, or the solely received one, of the pair of redundant SYNC messages, sending a pair of redundant DELAY_REQ messages over the pair of redundant networks respectively.

In some embodiments, the adjusting is based on a difference in propagation delay between the first and second redundant networks.

In some embodiments, the method further comprises estimating the difference in propagation delay between the first and second redundant networks based, at least in part, on a difference between respective receipt times of the pair of redundant SYNC messages.

In some embodiments, the determining of the time of receipt of the DELAY_REQ message from the second redundant network comprises: receiving, from the second redundant network, a DELAY_RESP message containing a timestamp representing the time of receipt of the DELAY_REQ message; and receiving an indicator that the timestamp in the DELAY_RESP message pertains to the second redundant network, wherein the indicator is the identity of the redundant network from which the DELAY_RESP message was received.

In another aspect, there is provided a method of facilitating Precision Time Protocol "PTP" synchronization of a slave clock and a master clock intercommunicating over pair of redundant networks, the method comprising: determining a time of receipt, from a first redundant network of the pair of redundant networks, of a firstly received one, or a solely received one, of a pair of redundant DELAY_REQ messages sent over the pair of redundant networks respectively; adjusting the time of receipt as though the DELAY_REQ message were received from a second redundant network of the pair of redundant networks, the adjusting resulting in an adjusted time of receipt; sending, over the first redundant network, a first DELAY_RESP message containing the unadjusted time of receipt of the DELAY_REQ message; and sending, over the second redundant network, a second DELAY_RESP message containing the adjusted time of receipt of the DELAY_REQ message.

In some embodiments, the adjusting is based on a difference in propagation delay between the first and second redundant networks.

In some embodiments, the method further comprises estimating the difference in propagation delay between the first and second redundant networks based, at least in part, on a difference between respective receipt times of the pair of redundant DELAY_REQ messages.

In another aspect, there is provided a method of facilitating Precision Time Protocol "PTP" clock synchronization of a slave clock with a master clock over a pair of redundant networks, comprising: embedding, in a PTP message destined for the slave clock, an indicator of an operational status of each of the redundant networks for carrying messages from the slave clock to the master clock; obtaining, from a PTP message destined for the master clock, an indicator of which one of the pair of redundant networks is valid for PTP clock synchronization; and selectively relaying PTP messages to the master clock based on whether the PTP messages have been received from the valid one of the redundant networks.

In some embodiments, the PTP message destined for the slave clock is a SYNC message.

In some embodiments, the method further comprises sending, over each of the redundant networks, the PTP message destined for the slave clock with the embedded indicators of operational status of each of the redundant networks for carrying messages from the slave clock to the master clock.

In some embodiments, the method further comprises determining the indicators of operational status of each of the redundant networks based on whether a PTP message destined for the master clock was successfully received from the respective redundant networks during a previous PTP clock synchronization cycle.

In some embodiments, the embedding embeds the indicator in a Type-Length-Value (TLV) of the PTP message destined for the slave clock.

In some embodiments, the method is performed by a PRP/HSR device.

In another aspect, there is provided a method of facilitating Precision Time Protocol "PTP" clock synchronization of a slave clock with a master clock over a pair of redundant networks, comprising: receiving, from one of the redundant networks, a PTP message destined for the slave clock; obtaining, from the PTP message destined for the slave clock, an indicator of an operational status of each of the redundant networks for carrying messages from the slave clock to the master clock; determining, based on the indicators from the PTP message, that the redundant network from which the PTP message was received is operable for carrying messages from the slave clock to the master clock; based on the determining, choosing the redundant network from which the PTP message was received as valid for PTP clock synchronization; and selectively relaying PTP messages to the slave clock based on whether the PTP messages have been received from the valid one of the redundant networks.

In some embodiments, the method further comprises embedding, in a PTP message destined for the master clock, an indicator indicating which of the redundant networks is valid for PTP clock synchronization.

In some embodiments, the embedding embeds the indicator in a Type-Length-Value (TLV) of the PTP message destined for the master clock.

In some embodiments, the PTP message destined for the master clock is a DELAY REQ message.

In some embodiments, the method is performed by a PRP/HSR device.

In some embodiments, the PTP message received by the receiving is a firstly received one of a pair of redundant SYNC messages sent over the pair of redundant networks respectively.

In another aspect, there is provided a non-transitory computer-readable medium storing instructions that, when executed by at least one microprocessor of a computing device, cause the computing device to effect any one of the above methods. In some embodiments, the computing device whose microprocessor(s) execute(s) the instructions is a PRP/HSR device, such as a doubly attached node containing a master clock or a slave clock, or a redundant box to which the master clock or slave clock is external.

In another aspect, there is provided a computing device for facilitating clock synchronization over redundant networks, the computing device being operable to: when a SYNC message and a DELAY_REQ message of a Precision Time Protocol "PTP" clock synchronization cycle are carried by different redundant networks, adjust a timestamp associated with one of the messages as though the SYNC message and the DELAY_REQ message were carried by the same redundant network.

In some embodiments, the computing device is compliant with at least one of the Parallel Redundancy Protocol (PRP) and High-availability Seamless Redundancy (HSR) protocols and the adjusting adjusts a timestamp in the DELAY_RESP message.

In some embodiments, the adjusting of the timestamp is based on a difference in propagation delay between the redundant networks.

In some embodiments, the computing device is further operable to pass the DELAY_RESP message with the adjusted timestamp to a slave clock, wherein the adjusting is transparent to the slave clock.

In some embodiments, the computing device that is operable to adjust the timestamp in the DELAY_RESP message is either a doubly-attached node comprising the slave clock or a redundant box to which the slave clock is external.

In some embodiments, the computing device that is operable to adjust the timestamp in the DELAY_RESP message is either a doubly-attached node comprising a master clock or a redundant box to which the master clock is external.

In another aspect, there is provided a computing device for facilitating Precision Time Protocol "PTP" synchronization of a slave clock and a master clock intercommunicating over pair of redundant networks, the computing device being operable to: determine a time of receipt of a SYNC message from a first redundant network of the pair of redundant networks; determine a time of receipt of a DELAY_REQ message from a second redundant network of the pair of redundant networks; and adjust the time of receipt of the DELAY_REQ message as though the DELAY_REQ message were received from the first redundant network.

In some embodiments, the SYNC message is a firstly received one, or a solely received one, of a pair of redundant SYNC messages sent over the pair of redundant networks respectively.

In some embodiments, the computing device is further operable to, in response to the receiving of the firstly received one, or the solely received one, of the pair of redundant SYNC messages, send a pair of redundant DELAY_REQ messages over the pair of redundant networks respectively.

In some embodiments, the adjusting is based on a difference in propagation delay between the first and second redundant networks.

In some embodiments, the computing device is further operable to estimate the difference in propagation delay between the first and second redundant networks based, at least in part, on a difference between respective receipt times of the pair of redundant SYNC messages.

In some embodiments, the determining of the time of receipt of the DELAY_REQ message from the second redundant network comprises: receiving, from the second redundant network, a DELAY_RESP message containing a timestamp representing the time of receipt of the DELAY_REQ message; and receiving an indicator that the timestamp in the DELAY_RESP message pertains to the second redundant network, wherein the indicator is the identity of the redundant network from which the DELAY_RESP message was received.

In another aspect, there is provided a computing device for facilitating Precision Time Protocol "PTP" synchronization of a slave clock and a master clock intercommunicating over pair of redundant networks, the computing device being operable to: determine a time of receipt, from a first redundant network of the pair of redundant networks, of a firstly received one, or a solely received one, of a pair of redundant DELAY_REQ messages sent over the pair of redundant networks respectively; adjust the time of receipt as though the DELAY_REQ message were received from a second redundant network of the pair of redundant networks, the adjusting resulting in an adjusted time of receipt; send, over the first redundant network, a first DELAY_RESP message containing the unadjusted time of receipt of the DELAY_REQ message; and send, over the second redundant network, a second DELAY_RESP message containing the adjusted time of receipt of the DELAY_REQ message.

In some embodiments, the adjusting is based on a difference in propagation delay between the first and second redundant networks.

In some embodiments, the computing device is further operable to estimate the difference in propagation delay between the first and second redundant networks based, at least in part, on a difference between respective receipt times of the pair of redundant DELAY_REQ messages.

In another aspect, there is provided a computing device for facilitating Precision Time Protocol "PTP" clock synchronization of a slave clock with a master clock over a pair of redundant networks, the computing device being operable to: embed, in a PTP message destined for the slave clock, an indicator of an operational status of each of the redundant networks for carrying messages from the slave clock to the master clock; obtain, from a PTP message destined for the master clock, an indicator of which one of the pair of redundant networks is valid for PTP clock synchronization; and selectively relay PTP messages to the master clock based on whether the PTP messages have been received from the valid one of the redundant networks.

In some embodiments, the PTP message destined for the slave clock is a SYNC message.

In some embodiments, the computing device is further operable to send, over each of the redundant networks, the PTP message destined for the slave clock with the embedded indicators of operational status of each of the redundant networks for carrying messages from the slave clock to the master clock.

In some embodiments, the computing device is further operable to determine the indicators of operational status of each of the redundant networks based on whether a PTP message destined for the master clock was successfully received from the respective redundant networks during a previous PTP clock synchronization cycle.

In some embodiments, the embedding embeds the indicator in a Type-Length-Value (TLV) of the PTP message destined for the slave clock.

In some embodiments, the computing device is a PRP/HSR device.

In another aspect, there is provided a computing device for facilitating Precision Time Protocol "PTP" clock synchronization of a slave clock with a master clock over a pair of redundant networks, the computing device being operable to: receive, from one of the redundant networks, a PTP message destined for the slave clock; obtain, from the PTP message destined for the slave clock, an indicator of an operational status of each of the redundant networks for carrying messages from the slave clock to the master clock; determine, based on the indicators from the PTP message, that the redundant network from which the PTP message was received is operable for carrying messages from the slave clock to the master clock; based on the determining, choose the redundant network from which the PTP message was received as valid for PTP clock synchronization; and selectively relay PTP messages to the slave clock based on whether the PTP messages have been received from the valid one of the redundant networks.

In some embodiments, the computing device is further operable to embed, in a PTP message destined for the master clock, an indicator indicating which of the redundant networks is valid for PTP clock synchronization.

In some embodiments, the embedding embeds the indicator in a Type-Length-Value (TLV) of the PTP message destined for the master clock.

In some embodiments, the PTP message destined for the master clock is a DELAY_REQ message.

In some embodiments, the computing device is compliant with at least one of the Parallel Redundancy Protocol (PRP) and High-availability Seamless Redundancy (HSR) protocols.

In some embodiments, the PTP message received by the receiving is a firstly received one of a pair of redundant SYNC messages sent over the pair of redundant networks respectively.

Other aspects and features of the present disclosure will become apparent to those of ordinary skill in the art upon review of the following description of specific embodiments in conjunction with the accompanying figures.

BRIEF DESCRIPTION OF THE DRAWINGS

In the figures, which illustrate example embodiments of the present disclosure.

DETAILED DESCRIPTION

Figure 1A:
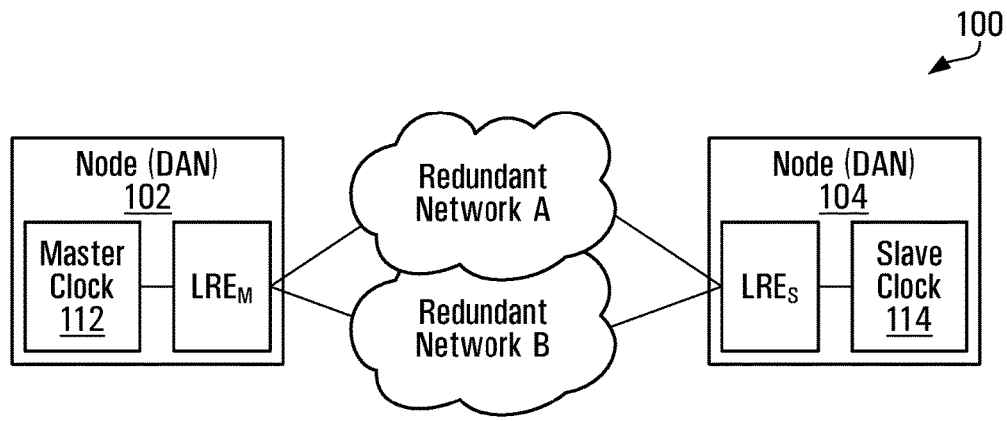
FIGS. 1A and 1B illustrate example distributed systems in schematic view.

Referring to FIG. 1A, an example of a distributed system 100 is illustrated in schematic view. As illustrated, the distributed system 100 includes two nodes 102 and 104 redundantly interconnected by a pair of redundant networks A and B. Other nodes may exist in the system 100 but are omitted from FIG. 1A for brevity. Each node 102, 104 may be a computing device of any type, such as a computer, mobile device, tablet, industrial machine, or a machine on the Internet of Things, to name but a few non-limiting examples. The nodes may be considered as forms of network devices. The redundant networks A and B may be local area networks (LANs) such as Ethernet networks, wide area networks (WANs), or other forms of digital or computer networks. The nodes may be connected to the networks through wired connections or wirelessly. The networks may be wired networks or wireless networks.

Each node 102, 104 comprises a respective clock 112, 114. The term "clock" as used herein is shorthand for Precision Time Protocol (PTP) clock, which may be considered as a device executing a Precision Time Protocol (PTP) stack. In some embodiments, a PTP clock may be a device that is participating in timing plane composed of PTP aware devices as defined in IEEE1588-2008 in order to achieve accurate network wide sense of time. In some embodiments, a PTP clock may be a node participating in the PTP protocol that is capable of providing a measurement of the passage of time since a defined epoch. A PTP clock may comprise a hardware clock circuit that uses an oscillator as a local clock reference, with readable register counters for providing time information and writable register counters for software-controlled time and frequency correction.

Each of the clocks 112, 114 is capable of generating, sending, receiving and parsing PTP messages such as SYNC, DELAY_REQ and DELAY_RESP messages. For clarity, the acronym "PTP" as used in this disclosure refers not only to the version IEEE 1588-2008 of the standard that is current at the time of this writing, which is hereby incorporated by reference hereinto, but also to other versions of IEEE 1588 including future versions.

In the illustrated example, both clocks 112, 114 are presumed to operate in the 1-step PTP mode of operation. As is specified in more detail in the IEEE 1588-2008 standard, the 1-step mode of operation of PTP dictates an exchange of three messages for clock synchronization: the SYNC message, the DELAY_REQ message, and the DELAY_RESP message. By way of this exchange, four timestamps t1, t2, t3 and t4 needed for the PTP clock offset algorithm are obtained. Timestamps t1 and t2 represent a time of transmission and a time of receipt, respectively, of a SYNC message sent from the master clock to the slave clock, and timestamps t3 and t4 represent a time of transmission and time of receipt, respectively, of a DELAY_REQ message sent in the opposite direction, from the slave clock to the master clock. The DELAY_RESP message acts merely as a transport for carrying the t4 timestamp back to the slave clock, given that t4 is determined at the master clock, while the PTP offset correction is effected at the slave clock.

The 1-step mode of operation of the clocks 112, 114 of this embodiment is to be distinguished from the 2-step mode of operation (also defined in the IEEE 1588-2008 standard) in which an additional FOLLOW_UP message is used for timestamp determination. The 2-step mode of operation is not used by the clocks 112, 114 of this embodiment but is used by the clocks of another embodiment that is described hereinbelow.

Referring again to FIG. 1A, it can be seen that the two clocks 112 and 114 are labeled as a master clock and a slave clock respectively. These labels reflect master and slave statuses that have been assigned to these respective clocks in accordance best master clock (BMC) algorithm of PTP, as defined in the IEEE 1588 standard. As is known in the art, the BMC algorithm selects a "best" master clock based on characteristics including quality, variance and others.

Each of nodes 102, 104 of the illustrated embodiment further contains a link redundancy entity (LRE). LREs are described generally in the IEC 62439-3 standard; in the IEC 62439-3:2012 edition of the standard, they are defined in Chapter 4.1.4 for PRP and in Chapter 5.2.2 for HSR. The role of an LRE, according to the standard, is essentially to duplicate messages that are outgoing (network-bound) and to transmit the duplicates over the respective redundant networks, transparently from the perspective of the entities communicating therethrough, and removing the duplicates at the receiving end. In the present embodiment, the entities communicating through the LREs in nodes 102 and 104 are the master clock 112 and slave clock 114 respectively. As such, the LRE in node 102 is referred to as $LRE_M$ (master LRE), and the LRE in node 104 is referred to as $LRE_S$ (slave LRE). The IEC 62439-3 standard, including the IEC 62439-3:2012 edition, is hereby incorporated by reference.

In addition to duplicating outgoing messages and removing duplicates from incoming redundant message pairs in accordance with IEC 62439-3 standard, the $LRE_M$ and $LRE_S$ of the present embodiment are "PTP-aware" in the sense that they are configured to effect a correction procedure whereby timestamps carried by certain PTP messages may be selectively modified. The selective modification is intended to ensure that all of the timestamps t1, t2, t3 and t4 that are ultimately provided to the slave clock 114 for PTP offset computation pertain to the same redundant network. This is done to promote the validity of the computed offset and, in turn, the validity of synchronization of the slave clock with the master clock, in view of the possibility that different ones of the messages sent during a single PTP clock synchronization cycle could be carried by different redundant networks. Moreover, the LRE may perform this function transparently from the perspective of the master clock and slave clock, e.g. at the PRP/HSR layer. The specifics of the correction procedure, aspects of which occurs at the master side and aspects of which occur at the slave side, are described in more detail below.

As shown in FIG. 1A, the $LRE_M$ is communicatively coupled to the master clock 112 and to the redundant networks A and B. Similarly, the $LRE_S$ is communicatively coupled to the slave clock 112 and to the redundant networks A and B. The port (interface) presented by each of $LRE_M$ and $LRE_S$ to the master clock 112 and slave clock 114 respectively may, in some embodiments (e.g. in the embodiment illustrated in FIG. 1B, as described below), appear as a conventional network port (interface). The two ports used by each link redundancy entity to access redundant networks A and B may be referred to as "port A" and "port B" respectively. The $LRE_M$ and $LRE_S$ may for example comprise hardware, firmware, one or more processors executing instructions loaded from memory, or combinations of these.

The nodes 102 and 104 illustrated in FIG. 1A may be referred to as doubly attached nodes (DANs). The term "doubly attached node" is defined in the IEC 62439-3 standard. A DAN may be considered as a network device adapted for use with a pair of redundant networks in accordance with PRP/HSR protocol(s) and may be referred to as a form of PRP/HSR device. In the present embodiment, the clock is contained within the same network device as the LRE. Other embodiments may adopt other configurations. For example, in some embodiments, the clock may be in one node (one device) while the LRE is in another device to which node is coupled. Such an alternative embodiment is illustrated in FIG. 1B.

Figure 1B:
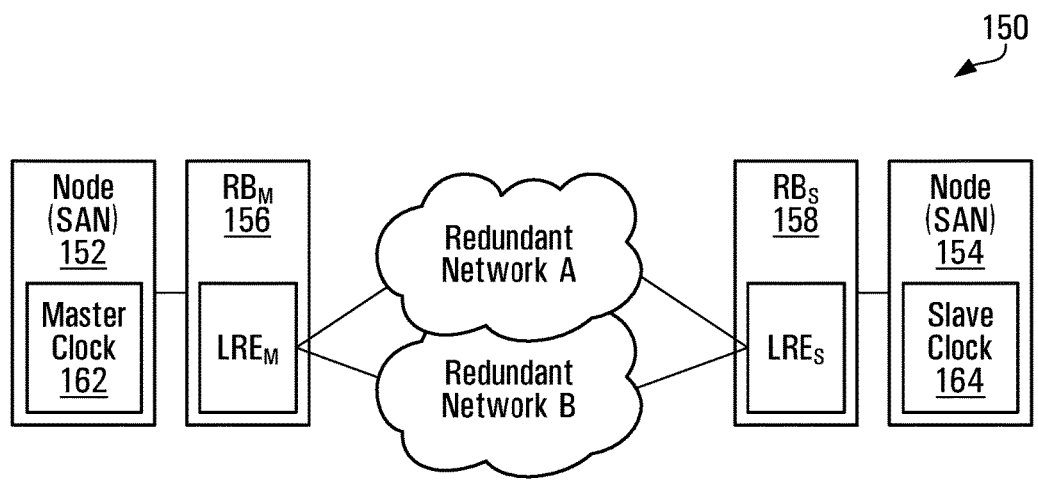

Referring to FIG. 1B, another embodiment of a distributed system is illustrated in schematic view. In many respects, the distributed system 150 of FIG. 1B is similar to the distributed system 100 of FIG. 1A. An exception that the master clock 162 and the slave clock 164 of FIG. 1B (which also operate in 1-step PTP mode) are contained within respective singly attached nodes (SANs) 152 and 154, while the associated link redundancy entities $LRE_M$ and $LRE_S$ are contained in separate network devices 156, 158 to which the SANs 152, 154 are communicatively coupled respectively. The latter network devices may be referred to as redundancy boxes or ("redboxes"). A redbox may be considered as a form of network device and/or a form of PRP/HSR device. A redbox may be considered to transparently provide PRP/HSR redundancy for a SAN coupled thereto. SANs and redboxes are described in the IEC 62439-3 standard. The network devices 156, 158 may be referenced herein using abbreviations $RB_M$ (master redbox) and $RB_S$ (slave redbox).

It will be appreciated that the correction procedure, by which the timestamp of certain PTP messages are modified, may be effected either at the same device that contains the associated master or slave clocks (e.g. in DAN 102 or 104), as in FIG. 1A, or in devices (e.g. redboxes $RB_M$ 156 and $RB_S$ 158) that are separate from the devices in which the respective master clock 162 and slave clock 14 are embedded/contained. Therefore, the below description of operation may be considered equally applicable to these two types of embodiments, among others.

Figure 2:
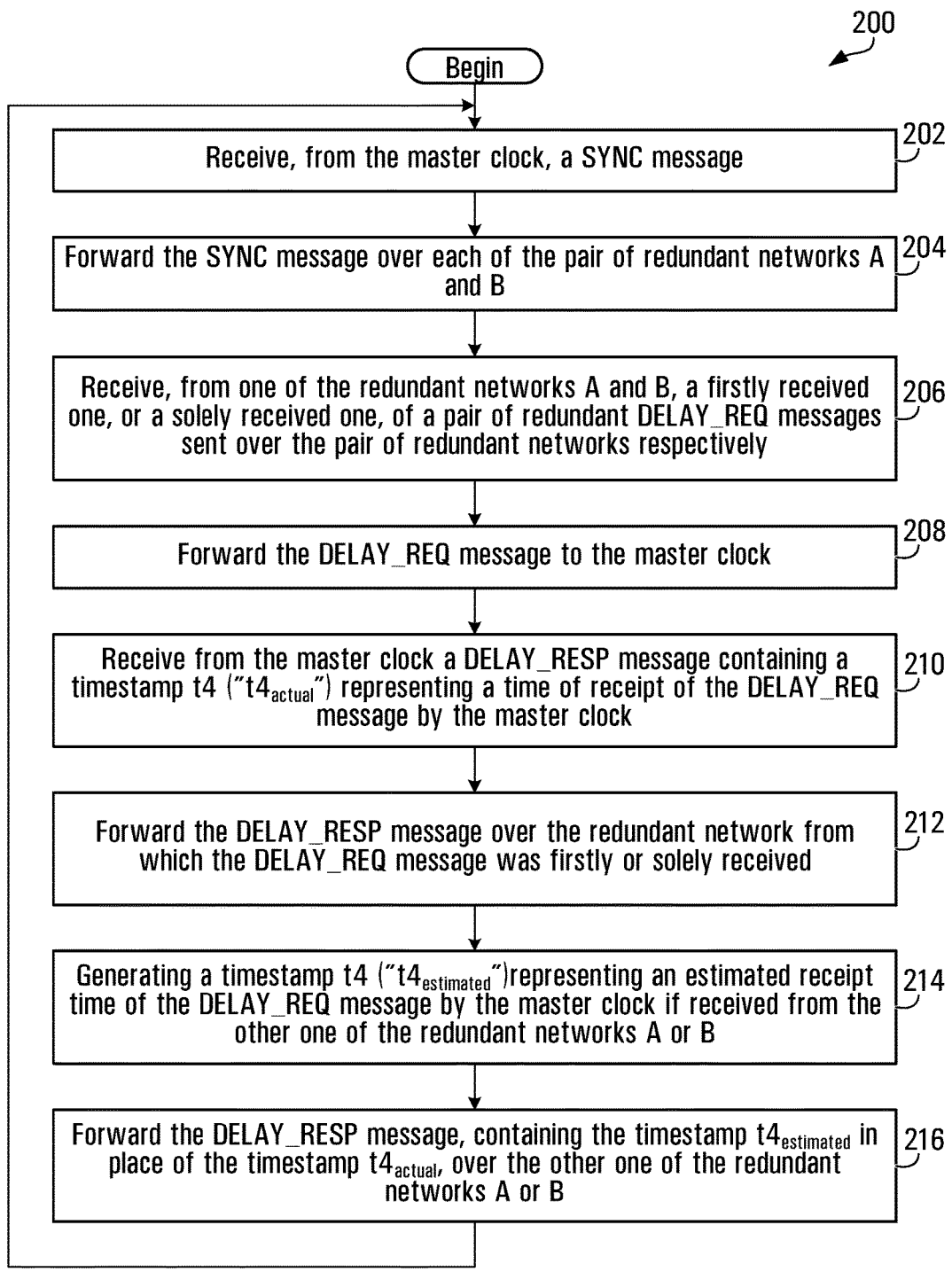
FIGS. 2 and 3 illustrate aspects of the operation of the example distributed systems of FIGS. 1A and 1B.
Figure 3:
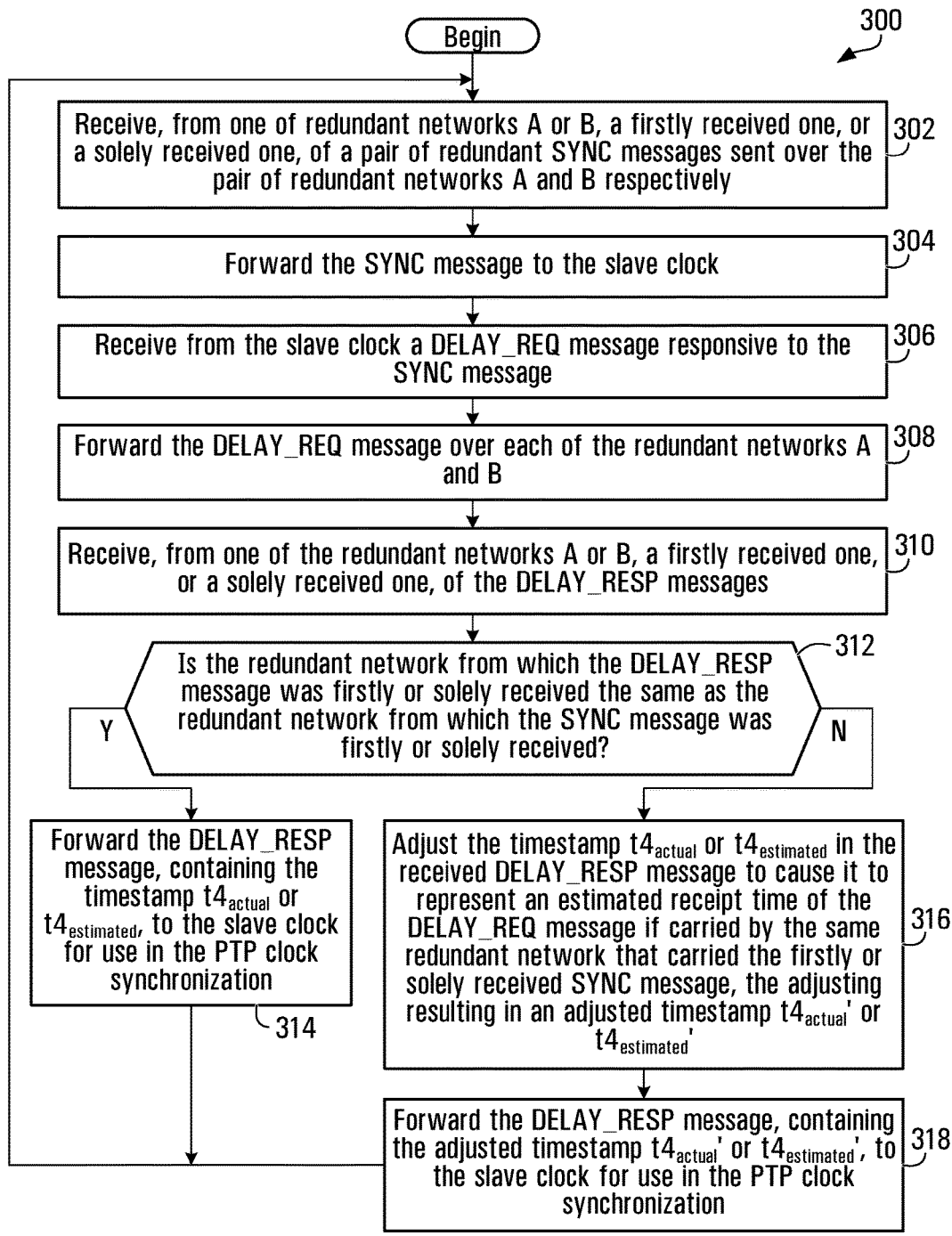
Figure 4:
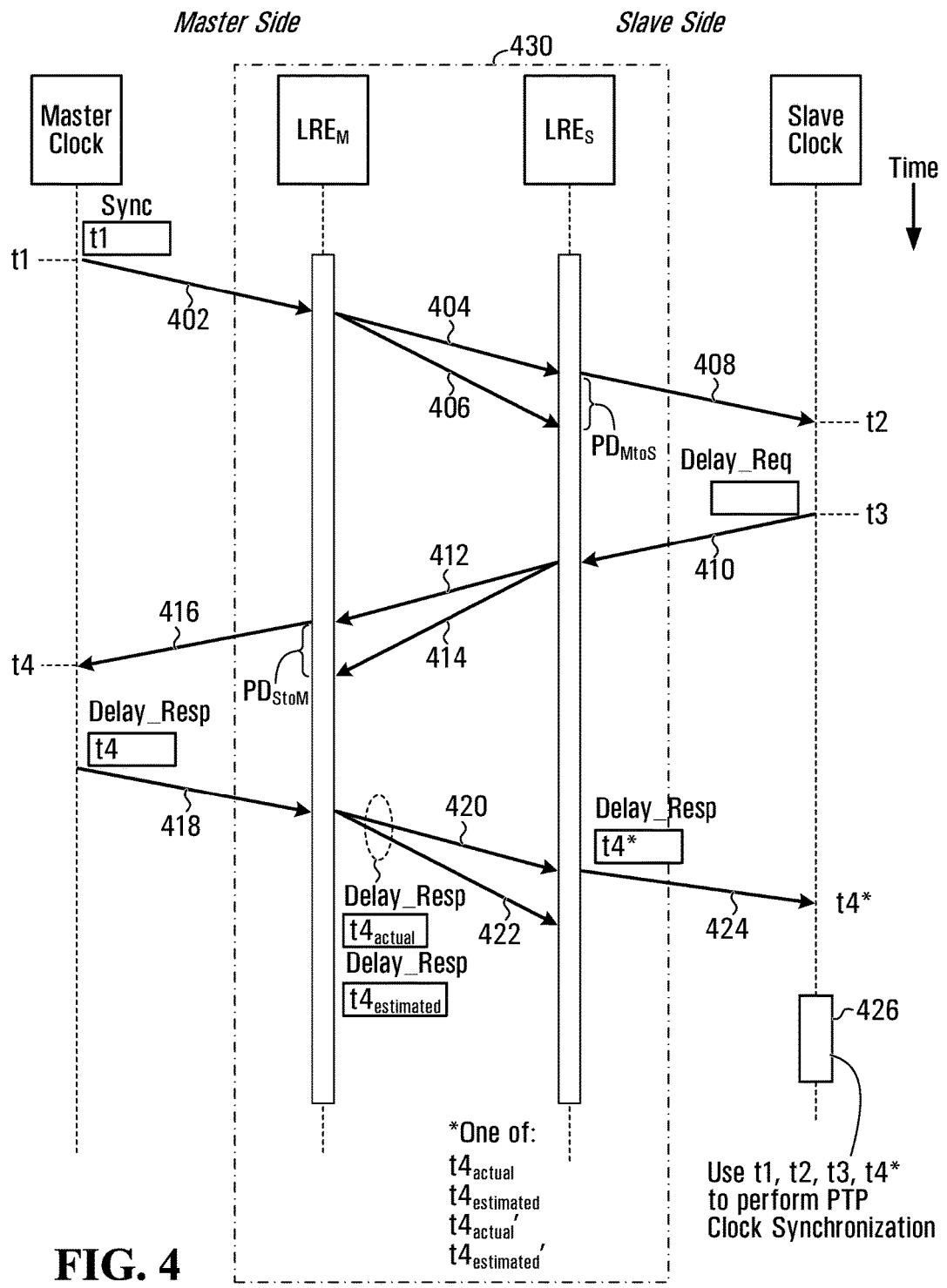
FIG. 4 is a sequence diagram illustrating messaging between components during a clock synchronization cycle.

Operation of the distributed system 100 or 150 for effecting PTP time synchronization over redundant networks is depicted in the flowcharts in FIGS. 2 and 3 and in the sequence diagram in FIG. 4. In particular, operation 200 of FIG. 2 illustrates master-side operation, e.g. at the $LRE_M$ of a network device such as the DAN 102 of FIG. 1A or the $RB_M$ 156 of FIG. 1B, that effects a master-side aspect of the correction procedure in the present embodiment. Operation 300 of FIG. 3 illustrates slave-side operation, e.g. at the $LRE_S$ of a network device such as the DAN 104 of FIG. 1A or the $RB_S$ 158 of FIG. 1B, that effects a slave-side aspect of the correction procedure in the present embodiment. Sequence diagram 400 of FIG. 4 illustrates messaging between various components of the example distributed systems 100, 150 of FIGS. 1A, 1B respectively during a clock synchronization cycle.

In the description of operation illustrated in FIGS. 2, 3 and 4 that follow, the term "master clock" is understood to include master clock(s) 112 and/or 162, and the term "slave clock" is understood to include slave clock(s) 114 and/or 164.

Referring to FIG. 4, the PTP synchronization message exchange may be commenced when the master clock sends a SYNC message containing a timestamp t1 representing the time of transmission of the SYNC message from the master clock (FIG. 4, 402). Referring to FIG. 2, the SYNC message is received at the $LRE_M$ (FIG. 2, 202). The $LRE_M$ may forward the SYNC message over each of redundant networks A and B (FIG. 2, 204), i.e. may duplicate the outgoing SYNC message and transmit the redundant messages over ports A and B respectively, as shown in FIGS. 4 at 404 and 406.

Referring to FIG. 3, at the $LRE_S$, in view of different propagation delays through redundant networks A and B, one of the SYNC messages, which may be referred to as the "early SYNC", may be received first, from one of the redundant networks A or B (see FIG. 3, 302 and FIG. 4, 404). The identity of the early_port$_{SYNC}$ may be either one of networks A or B and may vary between PTP clock synchronization cycles. An indicator identifying the redundant network (or port) from which the SYNC message was received may be stored, e.g. as a variable early_port$_{SYNC}$, for future use during selective modification of a timestamp t4, as described below. The early SYNC message may be immediately forwarded to the slave clock (FIG. 3, 304 and FIG. 4, 408). The slave clock may store the timestamp t1 from the message and may generate a timestamp t2 representing the time of receipt of the SYNC message at the slave clock.

When the other redundant SYNC message is subsequently received at the $LRE_S$ from the other redundant network (i.e. other port), the arrival time of the latter message at the $LRE_S$, relative to the former, together with the values of the correctionField fields from the two SYNC message, may be used to calculate a difference in propagation delay between the redundant networks may be used to calculate a difference in propagation delay $PD_{MtoS}$ between the redundant networks in the master-to-slave direction. The correctionField fields contain values representing the buffering delay measured at network nodes along a (typically) multi-hop path through relevant redundant network. This buffering delay is distinct from the transmission delay along the physical links of that path (or, in the case of a wireless network, over the air). The reason for computing the difference in propagation delay in this way is that the transmission delay over physical links (or over the air) is likely to remain constant, or relatively constant, over time. In contrast, buffering delays at interim nodes between network hops may fluctuate over time, e.g. due to variations in network load. Disregarding the buffering delays may thus yield a propagation delay $PD_{MtoS}$ that is a better predictor of probable future delay than if the buffering delays were not disregarded. The late-arriving SYNC message may (FIG. 4, 406) then be discarded, such that the early arriving SYNC message appears to the slave clock as the only SYNC message received during the present clock synchronization cycle.

In some cases it is possible that that only one of the SYNC messages will be successfully transmitted to the $LRE_S$, e.g. due to link failure on one of the redundant networks. In this case, no master-to-slave propagation delay $PD_{MtoS}$ is computed for the current SYNC message. Rather, the previous value of $PD_{MtoS}$, as computed in a previous iteration of operations 200 and 300, may be re-used as an approximation of the current delay.

In response to receiving the SYNC message, the slave clock may send a DELAY_REQ message to the $LRE_S$ (FIG. 4, 410) and may store a timestamp t3 representing the time of transmission of that message. The $LRE_S$ receives the DELAY_REQ message from the slave clock (FIG. 3, 306). The LREs may then forward the DELAY_REQ message over each of the redundant networks A and B, i.e. may duplicate the outgoing DELAY_REQ message and transmit the redundant messages over the pair of redundant networks (FIG. 3, 308 and FIGS. 4, 412 and 414).

Referring to FIG. 2, at the $LRE_M$, in view of different propagation delays through redundant networks A and B, one of the DELAY_REQ messages, which may be referred to as the "early DELAY_REQ", may be received first, from one of the redundant networks A and B (see FIG. 2, 206 and FIG. 4, 412). An indicator identifying the redundant network (port) from which the DELAY_REQ message was received, which may be either one of networks A or B, may be stored, e.g. as a variable early_port$_{DELAY\_REQ}$. The early DELAY_REQ message may be immediately forwarded to the slave clock (FIG. 2, 208 and FIG. 4, 416). The master clock may generate a timestamp t4 representing the time of receipt of the DELAY_REQ message at the master clock 112 or 162.

When the other redundant DELAY_REQ message is subsequently received at the $LRE_M$ from the other redundant network, the arrival time of the latter message at the $LRE_M$, relative to the former, together with the values of the correctionField fields from the two DELAY_REQ message, may be used to calculate a difference in propagation delay $PD_{StoM}$ between the redundant networks in the slave-to-master direction, in a similar manner to that in which $PD_{MtoS}$ was computed.

It is possible that that only one of the DELAY_REQ messages will be successfully transmitted to the $LRE_M$, e.g. due to link failure on one of the redundant networks. In this case, no master-to-slave propagation delay $PD_{StoM}$ is computed for the current DELAY_REQ message. Rather, the difference in propagation delay $PD_{StoM}$ computed in a previous iteration of operations 200 and 300 may be re-used as an approximation of the current delay.

In response to receiving the DELAY_REQ message, the master clock may generate a DELAY_RESP message, which contains the timestamp t4 representing the time of receipt of the DELAY_REQ message at the master clock. This timestamp t4 may be referred to as $t4_{actual}$ because it represents an actual time of receipt of the DELAY_REQ message at the master clock. From the perspective of the master clock of the present embodiment, this is the only DELAY_REQ message that is received during the present clock synchronization cycle. The DELAY_RESP message containing $t4_{actual}$ may then be transmitted to the $LRE_M$ (FIG. 4, 418).

At the $LRE_M$, the DELAY_RESP message containing the timestamp $t4_{actual}$ is received (FIG. 2, 210) and is forwarded over the redundant network from which the DELAY_REQ message was firstly or solely received, i.e. over the redundant network indicated by the early_port$_{DELAY\_REQ}$ variable (FIG. 2, 212 and FIG. 4, 420).

The $LRE_M$ also generates another timestamp $t4_{estimated}$ representing an estimated or probable time of receipt of the DELAY_REQ message by the master clock if carried by (as though received from) the other one of the redundant networks, i.e. the redundant network not identified by the early_port$_{DELAY\_REQ}$ variable (FIG. 2, 214). To compute the timestamp $t4_{estimated}$, the timestamp $t4_{actual}$ may be adjusted, e.g. by time-shifting $t4_{actual}$ by the computed difference in propagation delay $PD_{StoM}$ (e.g. by adding $PD_{StoM}$ to $t4_{actual}$). The generated timestamp $t4_{estimated}$ may be considered as an estimate of a time at which the other DELAY_REQ message would likely have arrived at the slave clock, given the difference in propagation delay $PD_{MtoS}$ between redundant networks that has recently been experienced. A copy of the DELAY_RESP message, containing the timestamp $t4_{estimated}$ in place of $t4_{actual}$, may then be sent over that redundant network (FIG. 2, 216 and FIG. 4, 422).

Further operation at the $LRE_S$ is based on a presumption, which is valid in the present embodiment but not necessarily for all embodiments, that the redundant network from which the DELAY_RESP message is received implicitly identifies the redundant network for which the contained t4 value is valid (i.e. implicitly identifies the redundant network to which the contained t4 value pertains).

In particular, at the $LRE_S$ a determination is made regarding whether the redundant network from which the DELAY_RESP message has been firstly or solely received is the same as the redundant network from which the SYNC message was firstly or solely received (FIG. 3, 312).

If the determination of FIG. 3, 312 is made in the positive, then it may be concluded that the t4 timestamp value in the firstly or solely received DELAY_RESP message (which may be either of $t4_{actual}$ or $t4_{estimated}$) pertains to the same redundant network as the timestamp t2 measured earlier in the message exchange (note that, in the present embodiment, the timestamps t1 and t3 are equally valid for both redundant networks). Based on the positive determination of FIG. 3, 312, the DELAY_RESP message, containing the timestamp $t4_{actual}$ or $t4_{estimated}$, is forwarded to the slave clock for use in the PTP synchronization (FIG. 3, 314).

If, on the other hand, the determination of FIG. 3, 312 is made in the negative, it may be concluded that the t4 timestamp value in the firstly or solely received DELAY_RESP message (whether $t4_{actual}$ or $t4_{estimated}$) pertains to a different redundant network from timestamp t2 that was measured earlier in the message exchange. Use of this value t4 in conjunction with the value t2 could jeopardize the validity of the clock offset computed using the PTP clock offset algorithm. To avoid this, the $LRE_S$ adjusts the t4 timestamp to ensure that timestamp t4 pertains to the same redundant network as t2 (so that all of the timestamps t1, t2, t3 and t4 will pertain to the same redundant network).

More specifically, the timestamp is adjusted (FIG. 3, 316) to represent and estimated or probable receipt time of the DELAY_REQ message if carried by the same redundant network that carried the firstly or solely received SYNC message earlier in the message exchange (i.e. the redundant network identified by the early_$port_{SYNC}$ variable). This adjustment is denoted in FIG. 4 using a prime (') symbol suffix. Thus, the adjustment of the timestamp $t4_{actual}$ or $t4_{estimated}$ in FIG. 3, 316 yields an adjusted timestamp $t4_{actual}'$ or $t4_{estimated}'$, respectively.

The adjustment of FIG. 3, 316 may for example be made by time-shifting the t4 value from the firstly or solely received DELAY_RESP message by the difference in propagation delay $PD_{MtoS}$ as earlier computed at the $LRE_S$ (e.g. by subtracting $PD_{MtoS}$ from $t4_{actual}$). Although it may be considered counterintuitive to adjust the time of receipt t4 of the DELAY_REQ message, which travels in the slave-to-master direction, by $PD_{MtoS}$ which represents a difference in propagation delay between the redundant networks in the opposite, i.e. master-to-slave, direction, using this approach in the present embodiment may avoid the need to send the $PD_{StoM}$ value that was computed at the $LRE_M$ to the $LRE_S$. Moreover, in at least some embodiments, it may be reasonable to presume that propagation delay across a redundant network is approximately the same in both directions.

Thereafter, the DELAY_RESP message, containing the adjusted timestamp $t4_{actual}'$ or $t4_{estimated}'$, may be forwarded to the slave clock for use in the PTP clock synchronization (FIG. 3, 318 and FIG. 4, 424).

It will be appreciated that the above-described operations 312, 314, 316 and 318 of the present embodiment may result in four different values of t4 ultimately reaching the slave clock 114, 164, depending upon two factors: (a) which of the two redundant DELAY_RESP messages sent at FIG. 4, 420, 422 is firstly or solely received at the $LRE_S$; and (b) whether the firstly or solely received DELAY_RESP message was received from the same redundant network as the firstly or solely received SYNC message (e.g. as indicated by early_$port_{SYNC}$). If the firstly or solely received DELAY_RESP message is the one containing $t4_{actual}$, then the value of t4 that ultimately reaches the slave clock 114, 164 at FIG. 3, 318 will either be $t4_{actual}$ or $t4_{actual}'$, depending upon whether the redundant network over which the DELAY_RESP message was firstly or solely received is same as, or different from, that by which the SYNC message was firstly or solely received, respectively. In contrast, if the firstly or solely received DELAY_RESP message is the one containing $t4_{estimated}$, then the value of t4 that ultimately reaches the slave clock 114, 164 at FIG. 3, 318 will either be $t4_{estimated}$ or $t4_{estimated}'$ depending upon whether the redundant network over which the DELAY_RESP message was firstly or solely received is same as, or different from, that by which the SYNC message was firstly or solely received, respectively.

The above-described approach results in appropriate adjustment of the timestamp t4 (i.e. with a view to ensuring that t4 pertains to the same redundant network as timestamp t2) regardless of which four permutations of redundant networks may be used to carry the firstly or solely received DELAY_REQ message and the firstly or solely received DELAY_RESP message. For example, the table below illustrates how t4, as provided by the master clock, may be selectively adjusted for each of the four possible permutations of redundant networks A and B that may carry the DELAY_REQ and DELAY_RESP messages that are firstly or solely received (in this example, it is assumed that the SYNC message was firstly or solely received from redundant network A):

TABLE 1

Permutations of t4 adjustment based on redundant networks used to carry DELAY_REQ and DELAY_RESP messages

| Port of first/sole arrival for: | | Manipulation of t4 in DELAY_RESP at: | |
|---|---|---|---|
| DELAY_REQ | DELAY_RESP | $LRE_M$ | $LRE_S$ |
| A | A | No adjustment of $t4_{actual}$ from master clock | No adjustment of $t4_{actual}$ from $LRE_M$ |
| B | A | Adjust $t4_{actual}$ from master clock to create $t4_{estimated}$ | No further adjustment of $t4_{estimated}$ from $LRE_M$ |
| B | B | No adjustment of $t4_{actual}$ from master clock | Adjust received $t4_{actual}$ to create $t4_{actual}'$ |
| A | B | Adjust $t4_{actual}$ from master clock to create $t4_{estimated}$ | Adjust received $t4_{estimated}$ to create $t4_{estimated}'$ |

The scenario represented by the first "A-A" row of Table 1 is to a standard PTP clock synchronization exchange over a non-redundant network in the sense that the SYNC, DELAY_REQ and DELAY_RESP messages that are used for clock synchronization are all carried by the same redundant network. The adjusted timestamps that are generated for redundant messages carried over the other redundant network are not used in this scenario.

In each of the scenarios represented by the second and third "B-A" and "B-B" rows of Table 1 respectively, the "winning" (firstly or solely received) DELAY_REQ message is carried by redundant network B, which is different from the redundant network A that carried the SYNC message. In these scenarios, the timestamp is adjusted to compensate for the delivery of different messages over different redundant networks. However, the adjustment is accomplished differently for each scenario.

In the scenario represented by the second row "B-A", the adjustment is performed at the $LRE_M$. Notably, this is done even though the $LRE_M$ lacks information for determining whether the "winning" DELAY_REQ message was carried by the same redundant network as, or a different redundant network from, the "winning" (i.e. firstly or solely received) SYNC message. In other words, the adjustment to timestamp t4 is made at the $LRE_M$ even though early_port$_{SYNC}$ is unknown to the $LRE_M$. Nevertheless, the adjustment adjusts timestamp t4 as though SYNC and DELAY_REQ were carried by the same redundant network.

By contrast, in the scenario represented by second row "B-B," it is the $LRE_S$ that adjusts timestamp t4, not the $LRE_M$. In this scenario, the $LRE_S$ takes this action based on the fact that early_port$_{SYNC}$ differs from early_port$_{DELAY\_RESP}$. It will be appreciated that this difference does not necessarily indicate that early_port$_{SYNC}$ differs from early_port$_{DELAY\_REQ}$, i.e. that the SYNC message was delivered on a different redundant network from the DELAY_REQ message. However, the difference between early_port$_{SYNC}$ and early_port$_{DELAY\_RESP}$ does indicate that the timestamp t4 contained in the DELAY_RESP message (whether $t4_{actual}$ or $t4_{estimated}$) pertains to a different redundant network that was used to carry the SYNC message. Again, the timestamp adjustment in this scenario, which unlike the previous scenario is performed by the $LRE_S$, adjusts t4 as though SYNC and DELAY_REQ were carried by the same redundant network.

Thus it should be appreciated that the disclosed for facilitating PTP clock synchronization appropriately adjusts timestamp t4 in both scenarios (of rows "B-A" and "B-B" of Table 1) even though neither the $LRE_M$ nor the $LRE_S$ independently concludes, in either scenario, that different redundant networks were used to carry the SYNC and DELAY_REQ messages. In at least some embodiments, this operation may yield certain benefits. For example, the operation may avoid the need effect a mechanism (possibly requiring an extension of the operative PTP standard) for sharing early_port$_{DELAY\_REQ}$ and early_port$_{SYNC}$ information between $LRE_M$ and $LRE_S$.

Finally, it will be appreciated that, in the fourth scenario represented by row "A-B" of Table 1, the adjustment of timestamp t4 is performed twice: first by the $LRE_M$ and then again by the $LRE_S$. Yet the manner in which the two adjustments are performed in the illustrated embodiment is such that the latter adjustment effectively cancels the former. That is, the offset $PD_{StoM}$ is added at the $LRE_M$ but the offset $PD_{MtoS}$ (which is likely substantially similar or equal to $PD_{StoM}$) is subtracted at the $LRE_S$. This is appropriate given the fact that early_port$_{SYNC}$ and early_port$_{DELAY\_REQ}$ in this scenario are the same.

Once the operation of FIG. 4, 424 has been completed, the slave clock will have all four timestamps t1, t2, t3 and t4 required for computing the offset using the PTP clock offset algorithm. The slave clock may then proceed, in accordance with IEEE 1588, to compute the offset and to synchronize itself with the master clock (FIG. 4, 426).

Operations 200 and 300 may be repeated, e.g. once for each subsequent PTP clock synchronization cycle.

It will be appreciated that all of the features of FIGS. 1A and 1B, all of the operations of FIGS. 2 and 3, and all of the messaging shown in FIG. 4 are not necessarily present in every embodiment. Some embodiments may have different or fewer features.

Figure 5:
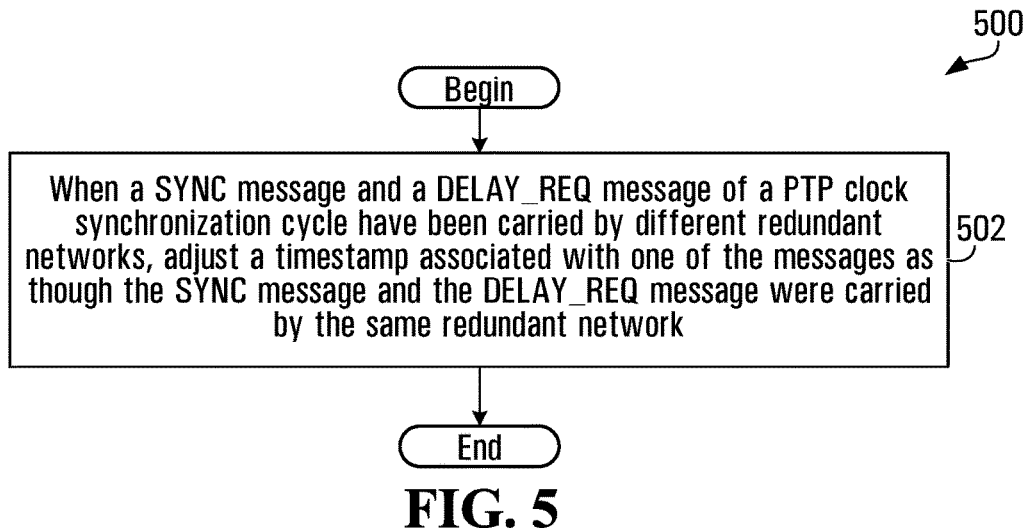
FIG. 5 illustrates operation of an alternative embodiment.

Referring to FIG. 5, a flowchart illustrating operation 500 of an alternative embodiment. The operation 500 may for example be effected in a network device coupled to a pair of redundant networks. The operation 500 may be effected in a PRP/HSR device, although this is not required. The network device may be communicatively coupled to, or may contain, a clock, which may execute a PTP stack. The clock may be a PTP slave clock.

At 502, when a SYNC message and a DELAY_REQ message of a PTP clock synchronization cycle have been carried by different redundant networks, a timestamp associated with one of the messages is adjusted as though the SYNC message and the DELAY_REQ message were carried by the same redundant network (i.e. to emulate carriage of the SYNC and DELAY_REQ messages by the same redundant network). Adjusting the timestamp may for example involve time-shifting the timestamp based on a difference between estimated or measured propagation delays through the redundant networks respectively. The adjusting of the timestamp may be performed by a PRP/HSR device that adjusts a timestamp contained within a DELAY_RESP message. The DELAY_RESP message with the adjusted timestamp may indistinguishable, at the slave clock, from a DELAY_RESP message with an unadjusted timestamp, with the result that the adjustment of the timestamp may be transparent to the slave clock. The slave clock may subsequently effect a PTP clock synchronization based, at least in part, on the adjusted timestamp.

Figure 6:
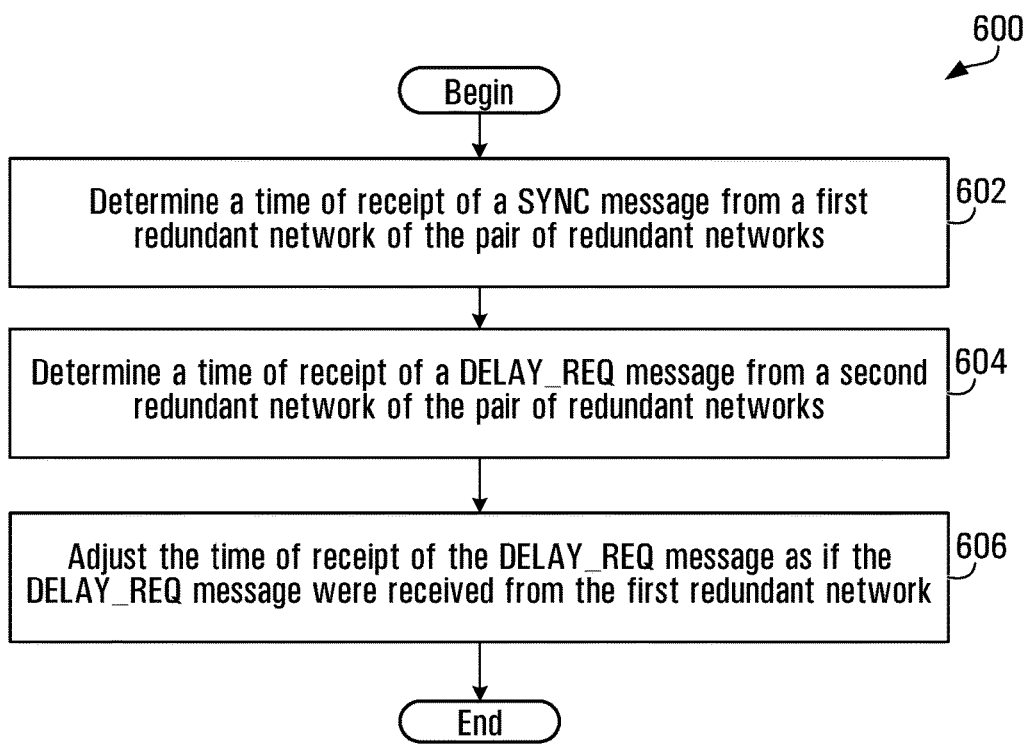
FIG. 6 illustrates operation of another alternative embodiment.

Referring to FIG. 6, a flowchart illustrating operation 600 of a further alternative embodiment is provided. The operation 600 may for example be effected in a network device coupled to a pair of redundant networks. The operation 600 may be effected in a PRP/HSR device, although this is not required. The network device may be communicatively coupled to, or may contain, a clock, which may execute a PTP stack. The clock may be a PTP slave clock.

At 602, a time of receipt of a SYNC message from a first redundant network of the pair of redundant networks is determined. This determination may for example entail recording a time of receipt of the message at a slave clock. At 604, a time of receipt of a DELAY_REQ message from a second redundant network of the pair of redundant networks is determined. This may for example entail measuring a time of receipt of the DELAY_REQ message at a master clock and/or receiving a message containing the measured time of receipt from the master clock. At 606, the time of receipt of the DELAY_REQ message is adjusted as though the DELAY_REQ message were received from the first redundant network (i.e. to emulate carriage of the DELAY_REQ message by the first redundant network). This may for example entail time-shifting either one of the times determined in 602 or 604 based on a determined or estimated propagation delay between the redundant networks. The slave clock may ultimately effect PTP clock synchronization based, at least in part, on the adjusted time.

Figure 7:
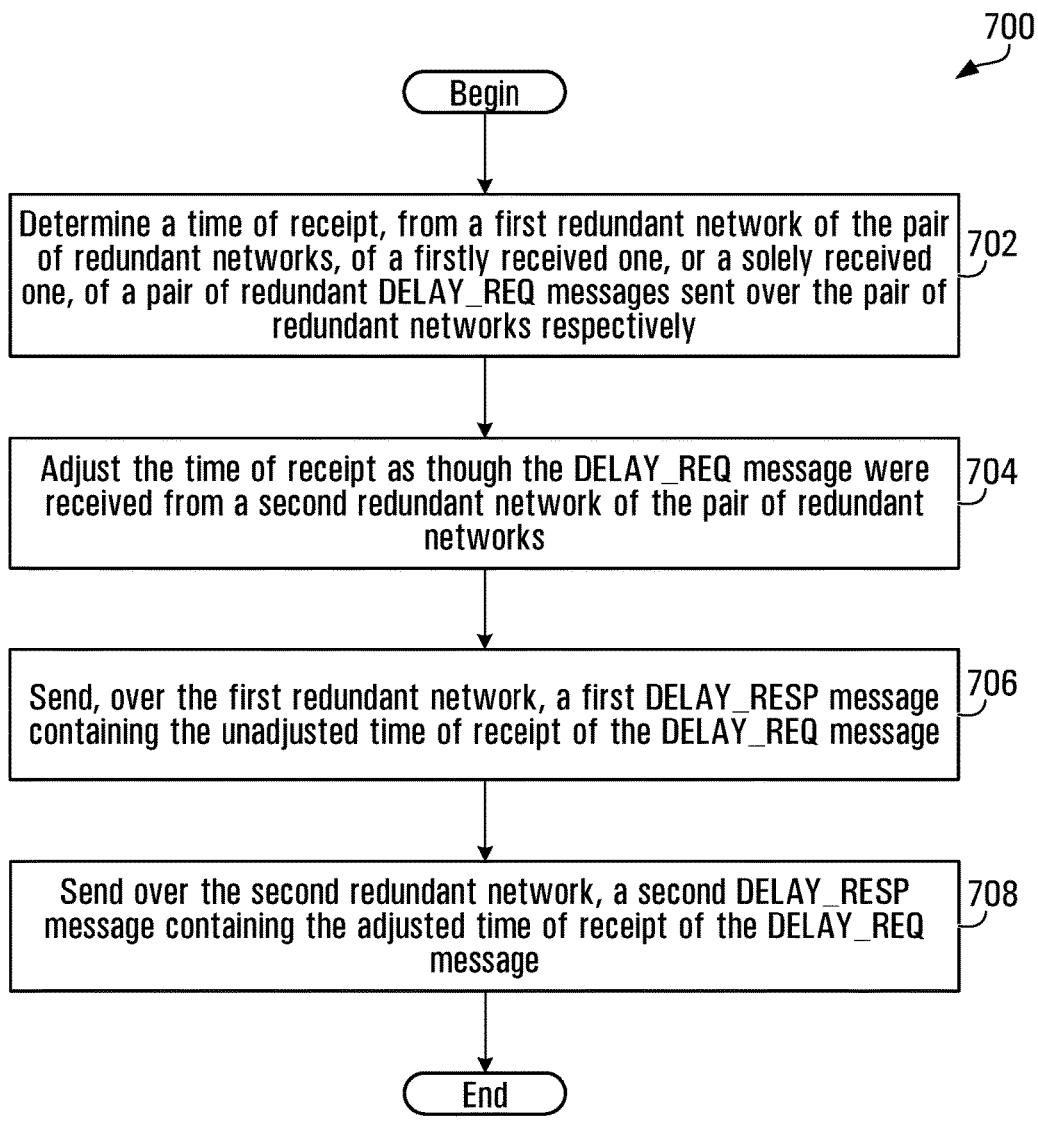
FIG. 7 illustrates operation of a further alternative embodiment.

Referring to FIG. 7, a flowchart illustrating operation 700 of a further alternative embodiment is provided. The operation 700 may for example be effected in a network device coupled to a pair of redundant networks. The operation 700 may be effected in a PRP/HSR device, although this is not required. The network device may be communicatively coupled to, or may contain, a clock, which may execute a PTP stack. The clock may be a PTP master clock.

At 702, a time of receipt of a DELAY_REQ message, from a first redundant network of a pair of redundant networks, is determined. The DELAY_REQ message is a firstly received one, or a solely received one, of a pair of redundant DELAY_REQ messages sent over the pair of redundant networks respectively. The determining may comprise reading a timestamp from a DELAY_RESP message received from a master clock. The determined time may be considered as an unadjusted time of receipt. At 704, the (unadjusted) time of receipt is adjusted as though the DELAY_REQ message were received from a second redundant network of the pair of redundant networks (i.e. to emulate carriage of the DELAY_REQ message by the second redundant network). At 706, a first DELAY_RESP message containing the unadjusted time of receipt of the DELAY_REQ message (i.e. as determined in 702) is sent over the first redundant network. At 708, a second DELAY_RESP message containing the adjusted time of receipt of the DELAY_REQ message (i.e. as determined in 704) is sent over the second redundant network.

It will be appreciated that one or more of the embodiments described herein may be considered advantageous in certain aspects.

Some embodiments may be considered robust in view of their tolerance to unidirectional link failure in one of the redundant networks. A unidirectional link failure may for example be a failure of a link in one direction in one of redundant networks A and B (but not in both networks), or a failure of a link in the other direction in one of redundant networks A and B (but not in both networks). The robustness may stem from the fact that, in some embodiments, receipt of only one of a pair of redundant incoming messages (e.g. SYNC, DELAY_REQ) may be sufficient for triggering a message in return on both redundant networks (e.g. DELAY_ REQ, DELAY_RESP respectively). It is noted that some measure of increased robustness may result even if this approach were only used, in some embodiments, for a select pair of sequential messages of a PTP clock synchronization cycle, rather than all the instances shown in FIG. 4, for example.

Some embodiments may be considered efficient both algorithmically and/or in terms of speed of response. Algorithmically, it may not be necessary to store or maintain many variables in memory. For example, each LRE (or other module/device) may maintain only two "state variables" for this purpose, namely an early_port variable and a propagation delay variable (e.g. early_port$_{DELAY\_REQ}$ and PD$_{StoM}$ at the master LRE, and early_port$_{SYNC}$ and PD$_{MtoS}$ at the slave LRE). Short term storage of two timestamps and subtraction of an "in-transit" buffering delay, e.g. as determined from correctionField values, may allow for quick computation of the difference in propagation delay (e.g. PD$_{MtoS}$ or PD$_{StoM}$) as described above.

As for speed of response, if a firstly received one of an incoming pair of redundant messages (e.g. SYNC, DELAY_REQ) is used to trigger a pair of redundant messages in return (e.g. DELAY_REQ, DELAY_RESP respectively), any delay that might otherwise have resulted from waiting for the second redundant message to arrive may be avoided. This may be particularly beneficial when the second message becomes lost, in which case waiting for that message may incur a particularly long delay. Despite these possible speed benefits, it is not absolutely required in all embodiments to necessarily use the firstly received one of an incoming pair of redundant messages to trigger redundant messages in response at each leg of the message exchange. Alternatively, a timer could be implemented. For example, a timer could be used to make a decision about giving up on waiting for the second SYNC message (in LREs/RBs) or the second DELAY_REQ message (in LREm/RBm) of a pair of redundant messages in the current synchronization cycle. In other words, expiration of the timer could be understood to mean that the second message was lost and the first received message was actually a solely received one. This timer may be effected by a device state machine implementing the algorithm.

In some embodiments, aspects of the correction procedure may be effected transparently from the perspective of the master clock and slave clock. This may allow standard clocks, e.g. clocks running a standard PTP stack (as may be used with a non-redundant network), to be used as master and slave clocks. That is, despite the fact that the messages to and from the clocks are carried across redundant networks, the transparency may avoid the need to customize the clocks for this purpose, e.g. through an extension of a governing standard (such as IEEE 1588-2008).

To illustrate the foregoing, consider that, in FIG. 4, if the operations encompassed by the dashed boundary 430 are performed at the PRP/HSR layer (e.g. within the LRE of master-side or slave-side DANs or redboxes) or a comparable layer (that may ordinarily refrain from modifying the contents of carried messages), then the operations may be transparent from the perspective of a master clock and slave clock at a higher layer (e.g. PTP). Accordingly, the operations encompassed by boundary 430 may, to the master and slave clocks, be indistinguishable from use of a single, non-redundant network for transmission of the SYNC, DELAY_REQ and DELAY_RESP messages. As such, it may be possible to employ redundant networks (e.g. for increased reliability) as described above even with existing clocks whose predetermined PTP clock synchronization functionality does not provide for, or even contemplate, the use of redundant networks.

It should be appreciated that, in the above description, operations that are described as occurring at a link redundancy entity (e.g. LRE$_M$ or LRE$_S$) could be effected at a device that does not strictly meet the definition of an LRE. Thus, none of the above description, nor the drawings, should be construed as strictly requiring the implementation of an LRE per se.

The following paragraphs describe various alternative aspects of the present disclosure.

In one aspect, there may be provided a method of facilitating PTP synchronization of a slave clock and a master clock that intercommunicate over pair of redundant networks, the method comprising:

receiving, from one of the pair of redundant networks, one of a pair of redundant SYNC messages sent over the pair of redundant networks respectively;

in response to the receiving of the one of the pair of redundant SYNC messages, sending a pair of redundant DELAY_REQ messages over the pair of redundant networks respectively.

In another aspect, there may be provided a method of facilitating PTP synchronization of a slave clock and a master clock that intercommunicate over pair of redundant networks, the method comprising:

receiving, from one of the pair of redundant networks, one of a pair of redundant DELAY_REQ messages sent over the pair of redundant networks respectively;

in response to the receiving of the one DELAY_REQ message on one of the pair of redundant networks, sending a pair of redundant DELAY_RESP messages on the pair of redundant networks respectively, wherein each of the redundant DELAY_RESP messages contains a DELAY_REQ message receipt time (t4) that is specific to the redundant network over which the DELAY_RESP message has been sent.

In another aspect, there may be provided a system for facilitating PTP synchronization of a slave clock and a master clock that intercommunicate over a pair of redundant networks A and B, the system comprising:

a first network device coupled to the pair of redundant networks and either coupled to or containing the master clock, the master network device operable to:
  receive, from the master clock, a SYNC message;
  forward the SYNC message over each of the redundant networks A and B;
a second network device coupled to the pair of redundant networks and either coupled to or containing the slave clock, the slave network device operable to:
  receive, from one of the redundant networks A or B, a firstly received one, or a solely received one, of the SYNC messages;
  forward the SYNC message to the slave clock;
  receive from the slave clock a DELAY_REQ message responsive to the SYNC message;
  forward the DELAY_REQ message over each of the redundant networks A and B;
the first network device being further operable to:
  receive, from one of the redundant networks A or B, a firstly received one, or a solely received one, of the DELAY_REQ messages;
  forward the DELAY_REQ message to the master clock;
  receive from the master clock a DELAY_RESP message containing a timestamp $t4_{actual}$ representing a receipt time of the DELAY_REQ message by the master clock;
  forward the DELAY_RESP message over the redundant network from which the DELAY_REQ message was firstly or solely received;
  generate a timestamp $t4_{estimated}$ representing an estimated receipt time of the DELAY_REQ message by the master clock if carried by the other one of the redundant networks A or B;
  forward the DELAY_RESP message, containing the timestamp $t4_{estimated}$ in place of the timestamp $t4_{actual}$, over the other one of the redundant networks A or B;
the second network device being further operable to:
  receive, from one of the redundant networks, a firstly received one, or a solely received one, of the DELAY_RESP messages;
  upon determining that the redundant network from which the DELAY_RESP message was firstly or solely received is the one from which the SYNC message was firstly or solely received:
    forward the DELAY_RESP message, with the unchanged timestamp $t4_{actual}$ or $t4_{estimated}$, to the slave clock for use in the PTP synchronization.
  alternatively, upon determining that the redundant network from which the DELAY_RESP message was firstly or solely received differs from the redundant network from which the SYNC message was firstly or solely received:
    adjust the timestamp $t4_{actual}$ or $t4_{estimated}$ in the received DELAY_RESP message to cause it to represent an estimated receipt time of the DELAY_REQ message if carried by the same redundant network that carried the firstly or solely received SYNC message, the adjusting resulting in an adjusted timestamp $t4_{actual}'$ or $t4_{estimated}'$; and
    forward the DELAY_RESP message, with the adjusted timestamp $t4_{actual}'$ or $t4_{estimated}'$, to the slave clock for use in the PTP synchronization.

In some embodiments, the master clock and slave clock may operate according to the 2-step PTP mode of operation rather that in the 1-step mode of operation. In the 2-step PTP mode, an additional FOLLOW_UP message is transmitted during each PTP clock synchronization cycle. This additional message may, in at least some embodiments, compromise the effectiveness of the approach illustrated in FIGS. 2-4. For example, when correction Field data is carried (in the Master-to-Slave direction) partly by the SYNC message and partly by the FOLLOW_UP message, and when correction Field data is carried (in the opposite direction) partly by the DELAY_REQ message and partly by the DELAY_RESP message, then computation of the propagation delay as described above (i.e. without considering the FOLLOW_UP message) may be inaccurate. In such embodiments, it may be desirable to adopt another approach whereby the $LRE_M$ and $LRE_S$ (or $RB_M$ and $RB_S$, or analogous network devices) essentially "agree" between them which of the redundant networks should serve as the "active network," i.e. should be treated as valid for PTP clock synchronization purposes. Thereafter, when the PTP messages of a clock synchronization cycle are sent in duplicate over the pair of redundant networks respectively, only the copies that are received from the valid network may be relayed or forwarded to the master or slave clock. The copies from the other redundant network may be discarded. Notably, this approach could be used to facilitate synchronization not only of clocks operating in 2-step PTP mode, but also of clocks operating in the 1-step PTP mode.

Figure 8:
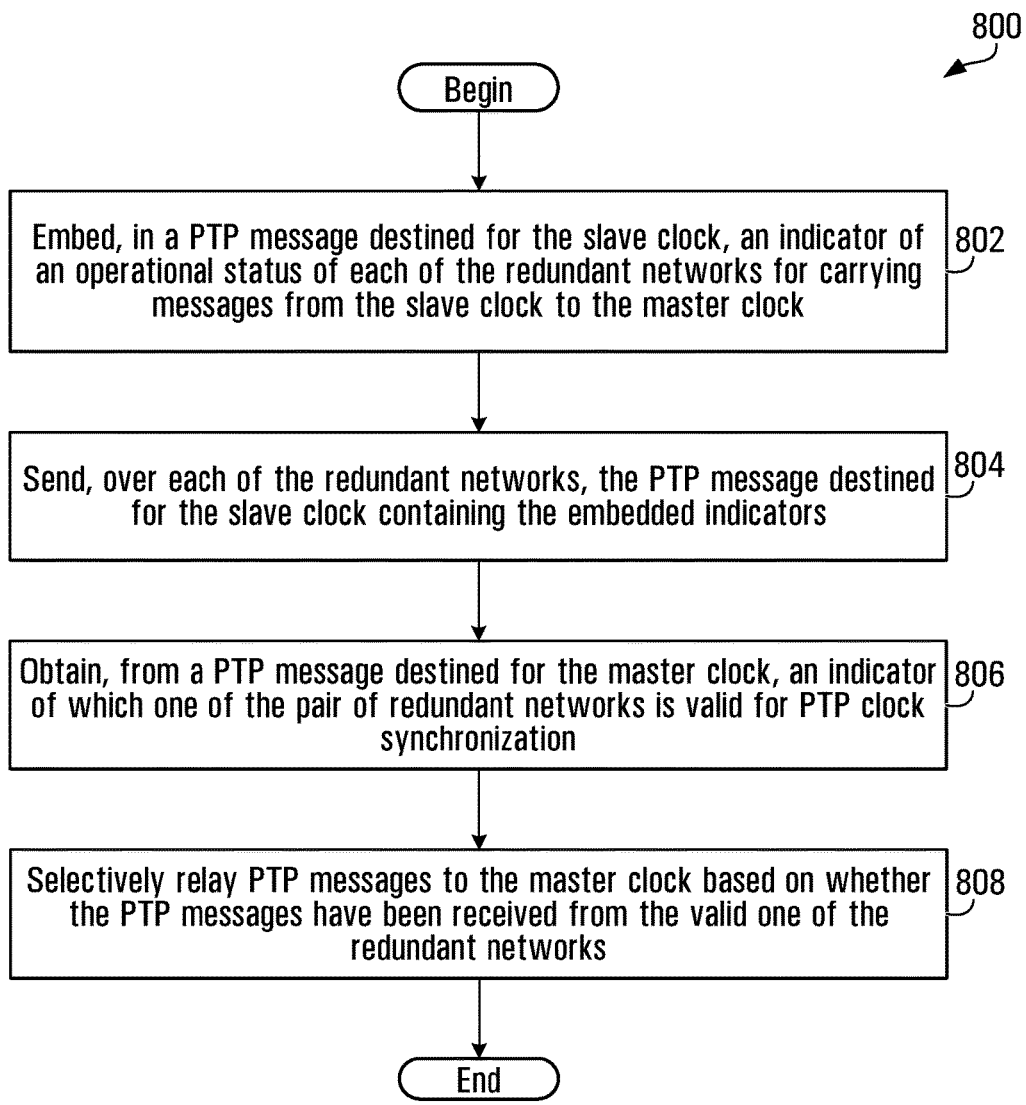
FIGS. 8 and 9 illustrate operation of yet another alternative embodiment.
Figure 9:
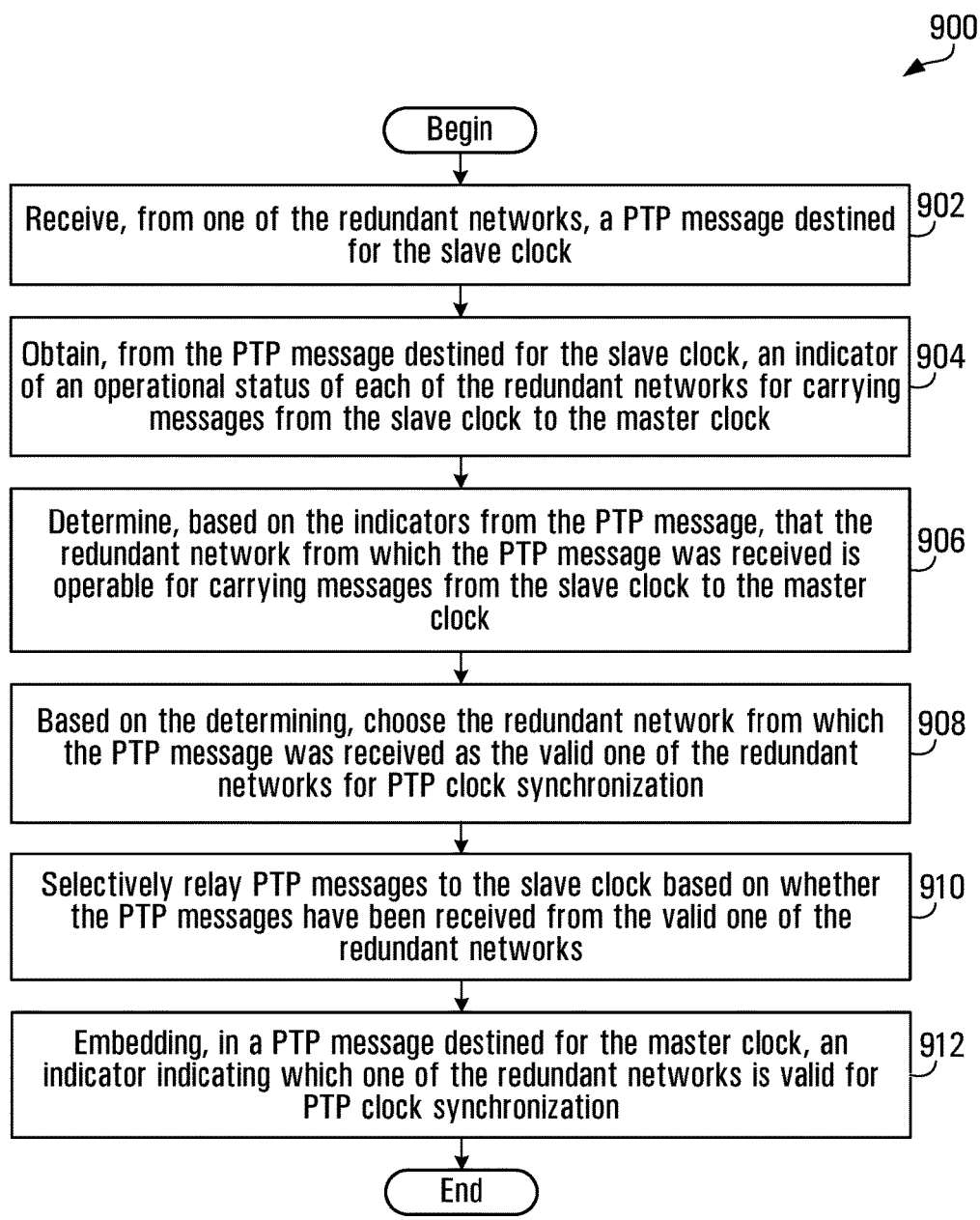

Operation of an alternative embodiment adopting such a strategy is illustrated in FIGS. 8 and 9. FIG. 8 illustrates operation 800 which may be performed by a "master" network device coupled to a pair of redundant networks and coupled to or encompassing a master clock. FIG. 9 illustrates operation 900 which may be performed by another, "slave" network device coupled to the pair of redundant networks and coupled to or encompassing a slave clock. The network devices may form part of a distributed system that is similar to the distributed system 100 or 150 of FIGS. 1A and 1B respectively. Either or both of the network devices may be PRP/HSR devices. The operations 800 and 800 may be performed within respective link redundancy entities.

At 802 (FIG. 8), an indicator of an operational status of each of the redundant networks for carrying messages from the slave clock to the master clock may be embedded in a PTP message destined for the slave clock. For example, upon receiving a SYNC message from the master clock, the master network device may append a Type-Length-Value (TLV) field to the SYNC message containing the indicators. There may be two indicators, each indicating status for a respective one of the redundant networks. The indicators may have been determined earlier at the master network device, e.g. based upon whether a PTP message (or redundant pair of such messages) destined for the master clock (such as the DELAY_REQ message) was successfully received from the redundant networks during a previous PTP clock synchronization cycle. In some embodiments, the determination may depend in part upon whether a predetermined time period was unexpired (e.g. both redundant copies of a PTP message may need to be received within a particular time period, else the operational status of the redundant network delivering the later copy may be set to "inoperative"). The indicators may take various forms, such as bits, bytes, structures, or others.

At 804 (FIG. 8), the PTP message destined for the slave clock containing the embedded indicators (e.g. the SYNC with appended TLV, further to the above example) may be sent over each of the redundant networks.

Referring to FIG. 9, at 902, one of the PTP messages destined for the slave clock (e.g. one of the SYNC messages with the appended TLV) may be received from one of the redundant networks. The received PTP message may for example be a firstly received one of the pair of redundant PTP messages.

At 904 (FIG. 9), an indicator of the operational status of each (both) of the redundant networks for carrying messages from the slave clock to the master clock is obtained from the PTP message destined for the slave clock (here, from the TLV of the SYNC message). At 906, based on the indicators, it is determined that the redundant network from which the PTP message was received is operable for carrying messages from the slave clock to the master clock. Based on the determination made in 906, at 908 the redundant network from which the PTP message was received may be chosen as the valid redundant network for PTP clock synchronization. A variable may be stored as a record of this choice. Thereafter, PTP messages may be selectively relayed to the slave clock based on whether they have been received from the valid one of the redundant networks (FIG. 9, 910). For example, the PTP message received at 902 may be so relayed. Redundant messages from the other ("invalid" or inactive) redundant network may be discarded, even if they arrive first.

In some embodiments, operations 902-910 may be performed using a SYNC message, as the SYNC message is the first in a PTP clock synchronization cycle. This may allow the slave network device to choose a valid (active) redundant network for the current PTP clock synchronization cycle, before the remainder of the PTP messages of the cycle are transmitted.

At 912, an indicator indicating which of the redundant networks is valid for PTP clock synchronization may be embedded in a PTP message destined for the master clock. For example, a TLV containing this indicator may be appended to a DELAY_REQ message that is being sent in response to a SYNC message from which the indicators may have been obtained. The indicator may take various forms, such as a bit, one or more bytes, structures, or others. This message may be sent over both of the redundant networks.

Referring to FIG. 8, when the PTP message destined for the master clock is received (the DELAY_REQ in this example), then the indicator indicating which of the pair of redundant networks is valid for PTP clock synchronization is obtained (FIG. 8, 806). This may inform the master network device of the valid redundant network that was chosen in 908 (FIG. 9) by the slave network device. A variable may be stored to locally record this choice.

Thereafter, the master network device may selectively relay PTP messages to the master clock (including the received DELAY_REQ message of this example) based on whether the PTP messages have been received from the valid one of the redundant networks.

The operations 800 and 900 may be executed anew for each clock synchronization cycle, possibly with the result that the valid redundant network to be used for PTP clock synchronization may change over time.

For embodiments in which the indicators are appended to PTP messages as TLV fields, a dedicated type may be registered with a relevant standards body for IEEE 1588.

In the above disclosure, operations described as occurring at network devices such as SANs, DANs, redboxes, in modules such as link redundancy entities, or otherwise, may be effected by one or more microprocessors executing instructions read from volatile or non-volatile memory which is non-transitory (e.g. computer readable media such as flash memory, magnetic storage media, optical storage media, or otherwise). Of course, the above described embodiments are intended to be illustrative only and in no way limiting. The described embodiments are susceptible to many modifications of form, arrangement of parts, details and order of operation within the scope of the claims.

The invention claimed is:

1. A Precision Time Protocol (PTP) based clock synchronization method between a master side and a slave side, the method comprising by the master side:
   sending a SYNC message over a first network at a first time and redundantly over a second network at a second time;
   receiving a DELAY_REQ message, solely over only one of the redundant networks, or over both of the redundant networks where the DELAY_REQ message is received firstly over one of the redundant networks and subsequently over the other of the redundant networks; and
   in response to receiving the DELAY _REQ message, sending a DELAY_RESP message over the redundant network that the DELAY _REQ message was solely or firstly received, adjusting a transmission time of the DELAY_RESP message based on a propagation delay between the first network and the second network, and sending the DELAY _RESP message with the adjusted transmission time over the other of the redundant networks,
   wherein a slave-side clock is synchronized with a master-side clock based, at least in part, on the adjusted transmission time.

2. The method of claim 1,
   wherein the propagation delay is estimated, at least in part, on a difference between respective receipt times of redundantly received DELAY_REQ messages.

3. The method of claim 1,
   wherein the adjusting is performed on at least one of a Parallel Redundancy Protocol (PRP) device and a High-availability Seamless Redundancy (HSR) device.

4. The method of claim 3,
   wherein the PRP device or the HSR device that performs the adjusting is part of a doubly-attached node comprising at a master-side clock or a redundant box to which the master-side clock is external.

5. The method of claim 1,
   wherein in response to receiving the DELAY_REQ message, the solely or firstly received DELAY _REQ message is forwarded to a master-side clock.

6. The method of claim 1,
   wherein in response to receiving the DELAY_REQ message over both of the redundant networks, the subsequent DELAY_REQ message is not forwarded to the master-side clock.

7. A Precision Time Protocol (PTP) based clock synchronization method between a master side and a slave side, the method comprising by the slave side:
   receiving a SYNC message over a first network and redundantly over a second network where the SYNC message is received firstly over one of the redundant networks and subsequently over the other of the redundant networks or solely over only one of the redundant networks;
   in response to receiving the SYNC message, sending a DELAY_REQ message over both the first network and the second network;
   receiving a DELAY_RESP message solely over only one of the redundant networks, or over both of the redundant networks where the DELAY_RESP message is received firstly over one of the redundant networks and subsequently over the other of the redundant networks; and in response to receiving the DELAY_RESP message, adjusting a time-of-receipt of the solely or firstly received DELAY_RESP message based on a propagation delay between the first and second redundant networks, and forwarding the DELAY_RESP message with the adjusted time-of-receipt to a slave-side clock, in response, wherein a slave-side clock is synchronized with a master-side clock based, at least in part, on an adjusted transmission time.

8. The method of claim 7, wherein the propagation delay is estimated, at least in part, on difference between respective receipt times of the SYNC messages.

9. The method of claim 7, wherein the adjusting is performed on at least one of a Parallel Redundancy Protocol (PRP) device and High-availability Seamless Redundancy (HSR) device.

10. The method of claim 9, wherein the PRP device or the HSR device performing the adjusting is part of a doubly-attached node comprising at a slave-side clock or a redundant box to which the slave-side clock is external.

11. A Precision Time Protocol (PTP) based clock synchronization method between a master side and a slave side, the method comprising:

the master side sending a SYNC message over a first network at a first time and redundantly over a second network at a second time;

the slave side receiving the SYNC message, solely over one of the redundant networks, or over both of the redundant networks where the SYNC message is received firstly over one of the redundant networks and subsequently over the other of the redundant networks;

in response to the slave side receiving the SYNC message, sending a DELAY_REQ message over the first network, and sending the DELAY_REQ message over the second network;

the master side receiving a DELAY_REQ message, solely over only one of the redundant networks, or over both of the redundant networks where the DELAY_REQ message is received firstly over one of the redundant networks and subsequently over the other of the redundant net-works;

in response to the master side receiving the DELAY_REQ message, sending a DELAY_RESP message over the redundant network that the DELAY_REQ message was solely or firstly received sending the DELAY_RESP message over both the redundant networks;

determining a propagation delay between the first network and the second network; and adjusting a timestamp in the DELAY_RESP message based at least in part by the propagation delay, the timestamp comprises at least one of a transmission time or a time of receipt, adjusting at least one of:
  i) the transmission time of the DELAY_RESP message by the master side, and
  ii) the time of receipt of the DELAY_RESP message by the slave side of the message, wherein a slave-side clock is synchronized with a master-side clock based, at least in part, on the adjusted timestamp.

12. The method of claim 11, comprising:

wherein the propagation delay is estimated, at least in part, on a difference between respective receipt times of redundantly received DELAY_REQ messages.

13. The method of claim 11, wherein the propagation delay is estimated, at least in part, on difference between respective receipt times of the SYNC messages.

14. The method of claim 11, comprising:

in response to receiving the DELAY_REQ message, forwarding the solely or firstly received DELAY_REQ message to a master-side clock.

15. The method of claim 11, in response to receiving the DELAY_REQ message over both of the redundant networks, the subsequent DELAY_REQ message is not forwarded to the master-side clock.

16. The method of claim 11, comprising:

in response to receiving the DELAY_RESP message, forwarding the solely or firstly received DELAY_RESP to a slave-side clock.

17. The method of claim 11, in response to receiving the DELAY_RESP message over both of the redundant net-works, the subsequent DELAY_RESP is not forwarded to the slave-side clock.

18. The method of claim 11, wherein only the transmission time of the DELAY_RESP message is adjusted.

19. The method of claim 11, wherein only the time of receipt of the DELAYRESP message is adjusted.

20. The method of claim 11, wherein the transmission time of the DELAY RESP message is adjusted, and wherein only the time of receipt of the DELAY RESP message is adjusted.

* * * * *